Jan. 9, 1923.

J. F. MAYS.
RESETTING MECHANISM FOR CALCULATING MACHINES.
FILED JUNE 26, 1919.

Witnesses

Inventor
James F. Mays,
by James L. Norris
Attorney.

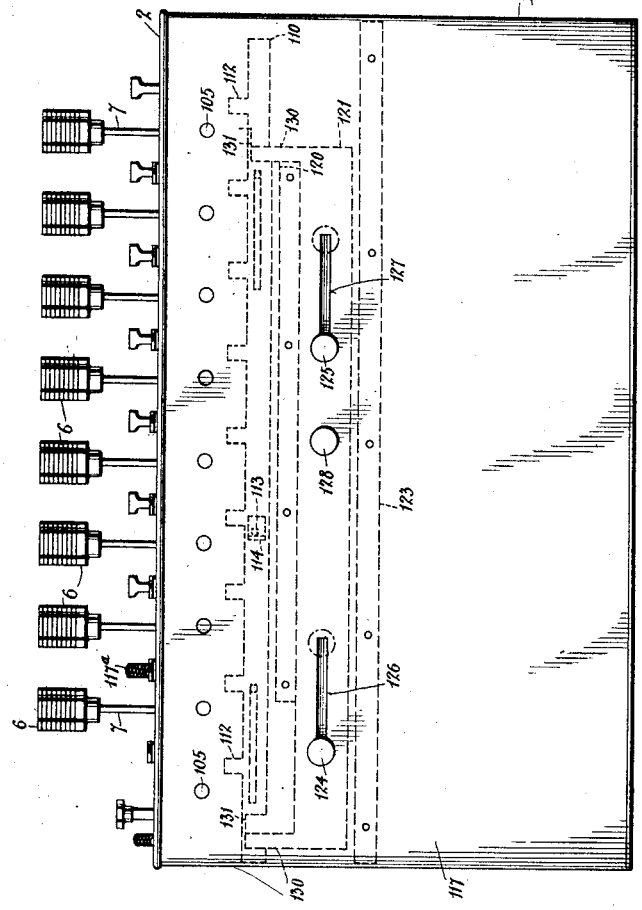

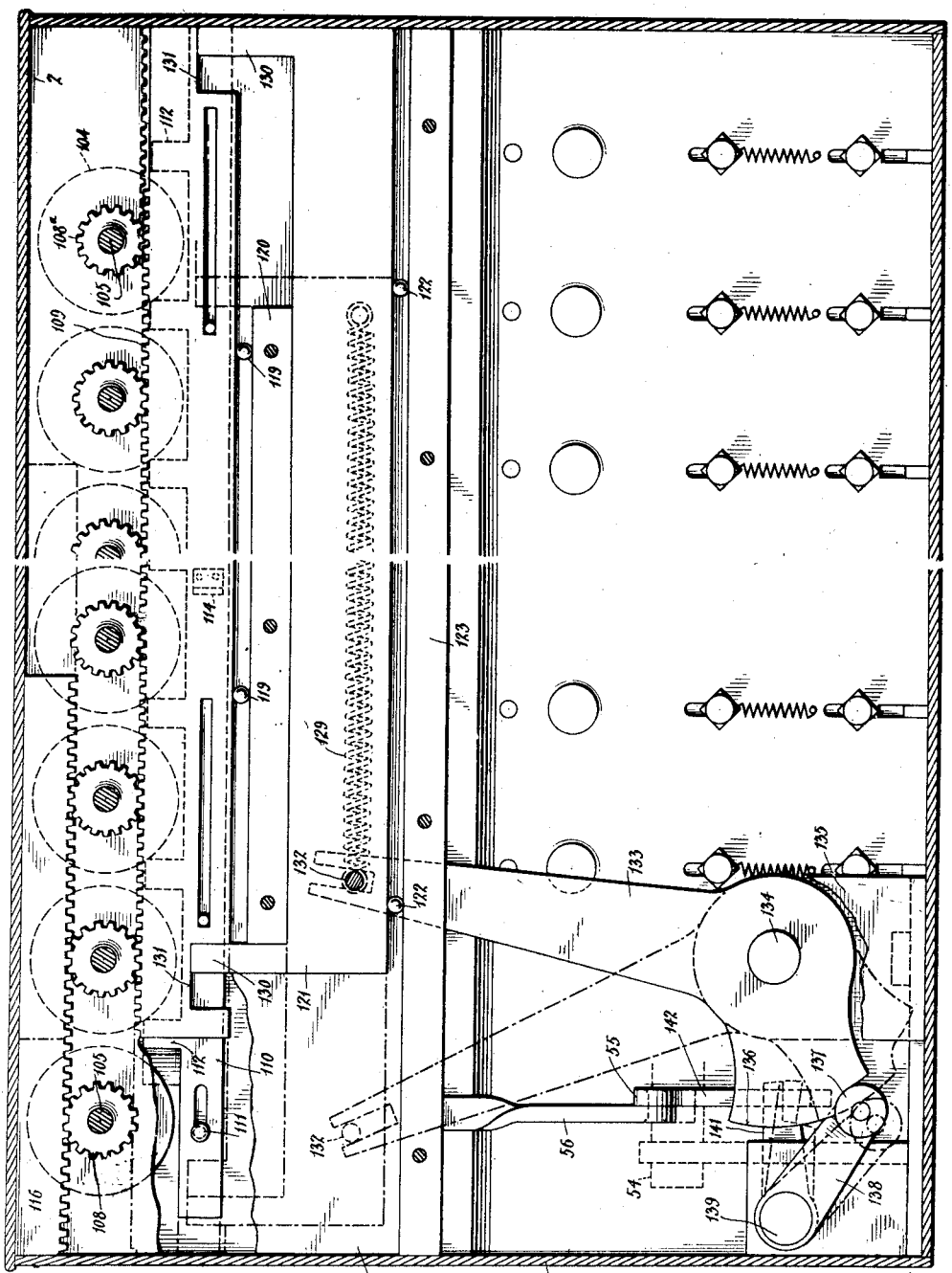

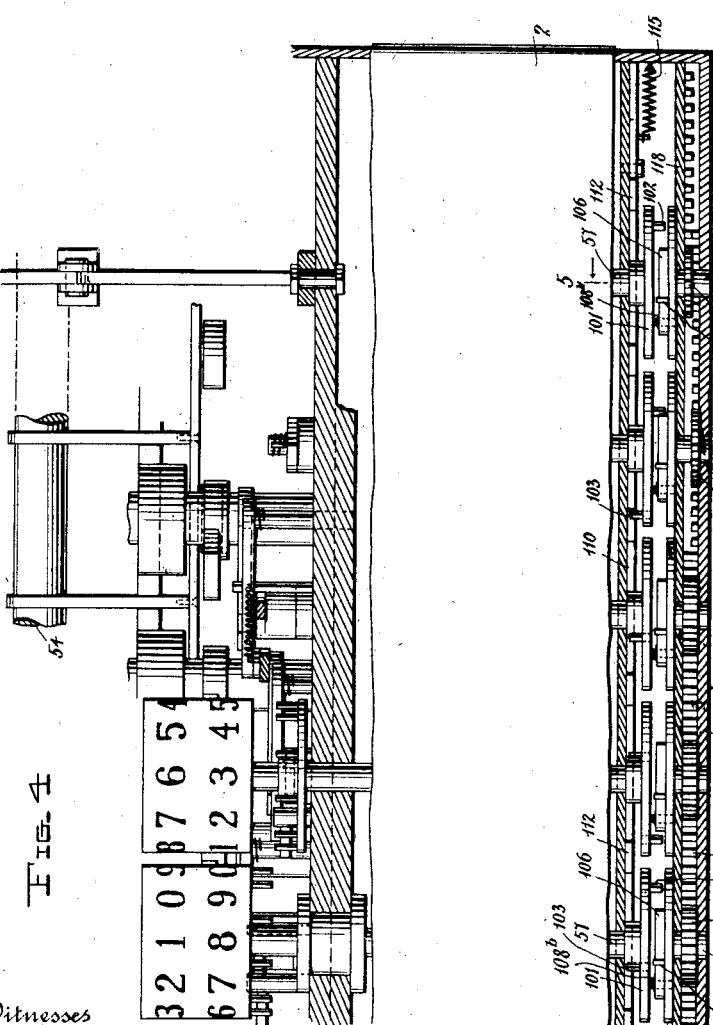

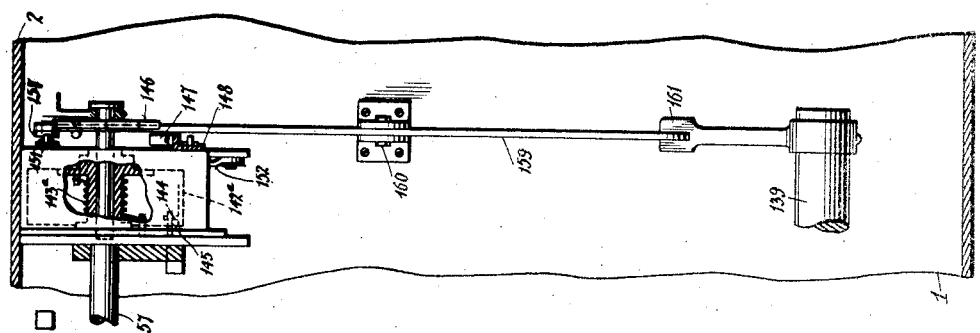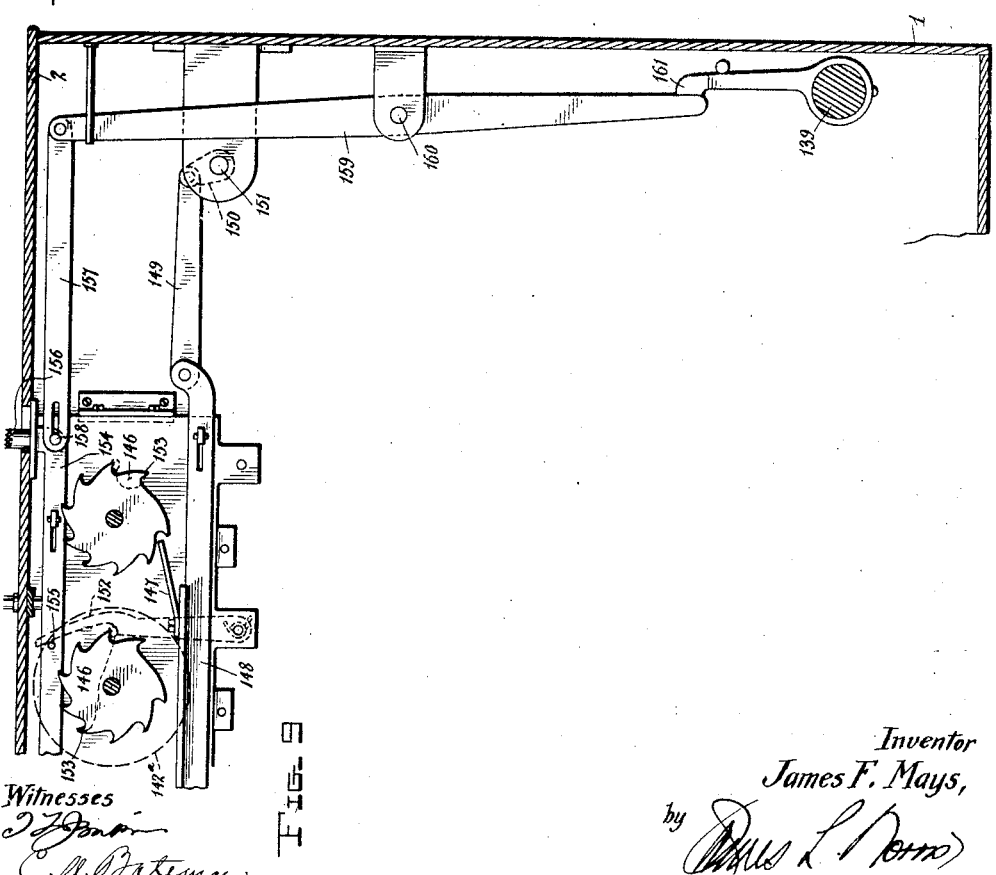

Jan. 9, 1923.

J. F. MAYS.
RESETTING MECHANISM FOR CALCULATING MACHINES.
FILED JUNE 26, 1919.

Witnesses

Inventor
James F. Mays,
by James L. Norris
Attorney.

Patented Jan. 9, 1923.

1,441,734

UNITED STATES PATENT OFFICE.

JAMES F. MAYS, OF LEXINGTON, NORTH CAROLINA, ASSIGNOR TO MAYS ACCOUNTING MACHINE COMPANY, OF LEXINGTON, NORTH CAROLINA, A CORPORATION OF NORTH CAROLINA.

RESETTING MECHANISM FOR CALCULATING MACHINES.

Application filed June 26, 1919. Serial No. 306,889.

*To all whom it may concern:*

Be it known that I, JAMES F. MAYS, a citizen of the United States, residing at Lexington, in the county of Davidson and State of North Carolina, have invented new and useful Improvements in Resetting Mechanism for Calculating Machines, of which the following is a specification.

My present invention relates to improvements in calculating machines and more especially to those of the type employing numeral wheels or dials which are advanced by or under the control of keys to indicate the results in an operation of addition, subtraction, multiplication or division.

The primary object of the invention is to provide novel and improved means for resetting the dials upon completion of an operation, the dials being thus brought to zero position to prepare the machine for another calculation. According to the present invention, which is an improvement upon the resetting mechanism shown and described in my prior Patent No. 842,682, granted January 29, 1907, the resetting operation is performed with facility and without requiring any considerable exertion on the part of the operator, and furthermore, the relatively large resetting crank or handle commonly used heretofore on calculating machines is rendered unnecessary and may be dispensed with and replaced by relatively small knobs which do not project appreciably from the casing of the machine and avoid other objections presented by the usual resetting crank or handle.

To these and other ends, the invention consists in certain improvements and combinations and arrangements of parts all as will be hereinafter more fully described, the features of novelty being pointed out particularly in the claims at the end of the specification.

In the accompanying drawings:—

Fig. 2 represents a front elevation of the machine shown in Fig. 1.

Fig. 3 represents on an enlarged scale the dial resetting mechanism as viewed from the front.

Fig. 4 is a top plan view of the forward portion of the machine showing the same partly in cross section to illustrate the resetting mechanism and certain of the dials on which the resetting mechanism operates.

Fig. 5 represents a vertical section taken on the line 5—5, Fig. 4 and looking in the direction of the arrows.

Figs. 6, 7 and 8 are diagrammatic views illustrating successively and respectively the positions of the overthrow check prior or during the resetting operation, the position of the overthrow check when the resetting operation is terminated, and the position of the overthrow check when returned to its normal or initial position.

Fig. 9 illustrates a portion of the resetting mechanism for the quotient dials.

Fig. 10 illustrates the mechanism shown in Fig. 9 as viewed from the left.

Similar parts are represented by the same reference characters in the several views.

Dial resetting mechanism embodying the present invention is applicable generally to calculating machines employing numeral wheels or dials for indicating the results of operations performed on the machine. The preferred embodiment of the invention is shown in the accompanying drawings and will be hereinafter described in detail as applied to a calculating machine of one particular type. It is to be understood, however, that the invention is not limited in its use to the machines of the particular type shown and it will also be understood that the invention is not restricted to the precise construction shown, as equivalent constructions are contemplated and will be included within the scope of the claims.

Figure 1:
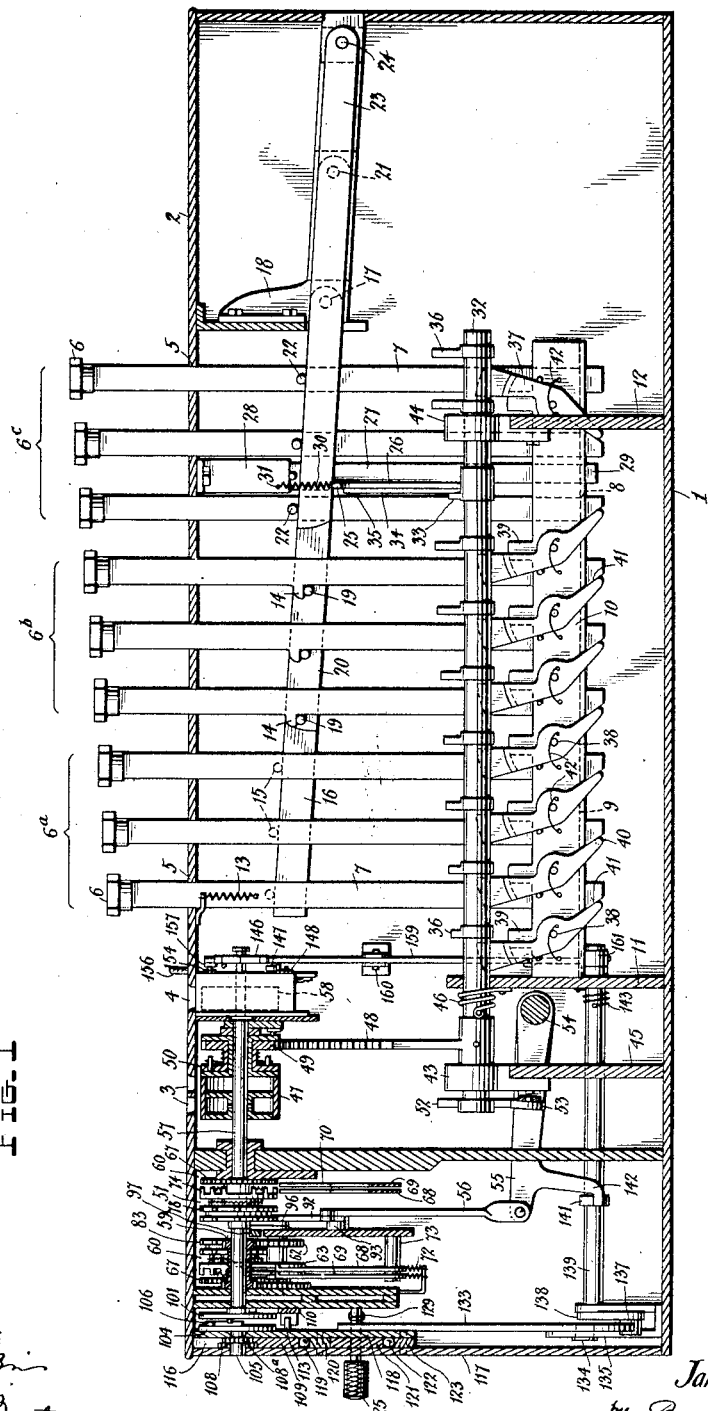
Fig. 1 represents a vertical section taken longitudinally through a calculating machine embodying dial resetting mechanism constructed in accordance with the present invention.
Figure 11:
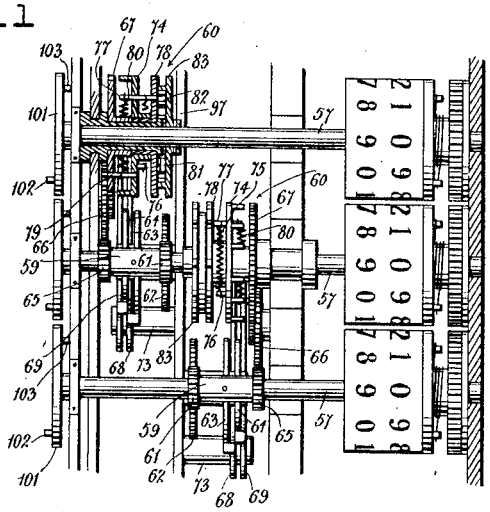
Fig. 11 is a top plan view, partly in section, showing a portion of the machine, and particularly the carry mechanism.

In the present instance the machine comprises a suitable casing 1 which is preferably of a generally rectangular construction, the top plate 2 having openings 3 and 4 therein through which the numerals on the primary registrating dials and the quotient dials respectively may be observed and the top of the casing is also provided with slots or openings 5 through which the key bars operate. The keyboard shown is similar in its general construction and mode of operation to that shown and described in my prior Patent No. 1,301,073, granted April 15, 1919. It comprises briefly, a suitable number of columns of keys 6, there being nine keys in each column corresponding to the numerals 1 to 9 inclusive, the key at the extreme left in Fig. 1 corresponding to the numeral 1 and the keys to the right of said key corresponding successively to the numerals 2 to 9 inclusive. For convenience, I will designate the groups of keys $6^a$ as corresponding to the numerals 1, 2 and 3, respectively, taken in their order from left to right; the group of keys $6^b$ as corresponding to the numerals 4, 5 and 6, respectively, reading in the same order; and the groups of keys $6^c$ as corresponding to the numerals 7, 8 and 9 respectively, reading in the same order. Each key is provided with a key bar or stem 7 which extends downwardly through the respective slot or opening 5 in the top of the casing and through a guiding slot 8 formed in a flange 9, this flange constituting a part of an angle bar 10. One of these angle bars 10 is provided for each column of keys, it being supported rigidly within the casing by transverse plates or supports 11 and 12. A spring 13 is attached at one end to the top of the casing and at its other end to a key bar and serves to return each key to its normal or elevated position and to hold the respective key in such position until operated. Each key bar for the keys of the group $6^b$ is provided with an operating projection 14. The key bars for the groups of keys $6^a$ are provided with lateral projections 15 which normally rest upon the top of a key lever 16, this key lever being pivoted at 17 to a bracket 18, the latter being fixed within the casing. The operating projections 14 for the group of keys $6^b$ normally rest upon pins 19 which project from one side of a second key lever 20, the latter being pivoted to the bracket 18 at the point 21 and the key bars for the groups of keys $6^c$ are provided with lateral projections 22 which normally rest upon the top of a third key lever 23, the latter being pivoted to the bracket 18 at the point 24. The key levers 16, 20 and 23 for each column of keys rest upon a step or shoulder 25 which is formed on or carried by an actuating bar 26, the upper end 27 of the actuating bar being slidable vertically in a guide 28 fixed to the under side of the top of the casing and the lower end 29 of the actuating bar extending through a guiding slot formed in the flange 9 of the angle bar 10. Owing to the differential pivoting of the key levers 16, 20 and 23, and hence the varying distances of the pivotal centers of these key levers from the step or shoulder 25 on the actuating bar 26, the actuating bar 26 will be actuated or depressed differentially or to varying extents as determined by the values represented by the different keys. The bar 26 and also the key levers 16, 20 and 23 are returned to their normal or elevated position and are held in such position by a tension spring 30, one end of which is attached to the bar 26 and the other end of which is attached to a pin 31 on the stationary guide 28. The differential movements of the bar 26 are transmitted to a dial actuating shaft 32 preferably through a crank 33 which is fixed to the shaft 32 and a link or connecting rod 34, one end of which is pivotally connected to the crank 33 and the other end of which is connected to the bar 26 by the pivot pin 35. One of these dial actuating shafts 32 is provided for each column of keys, and each shaft 32 is shown provided with means set by the different keys for limiting the rotation thereof as determined by the value represented by the key which is struck, thus preventing overthrow or excess motion of the numeral dial which is actuated by this shaft. Such means corresponds in its general construction and mode of operation to that shown and described in my prior Patent No. 1,315,144 granted Sept. 2, 1919. It consists briefly of a series of stop arms 36 fixed to the shaft 32, these stop arms radiating from the shaft at graduated angles to conform with the different angles through which the shaft rotates to advance the numeral dial to the proper extent to correspond with the value represented by the different keys. This overthrow means also comprises stops 37 which are pivoted at 38 to the vertical flange 9 of the angle bar 10, the upper ends of the stops 37 being offset to overlie lugs 39 formed on the upper edge of the angle bar 10 and the lower ends of the stops being bent laterally to form projections 40 arranged to be engaged and deflected by incline or cam surfaces 41 on the respective key bars. The stops 38 are normally held in a position to clear the stop arms 36 on the shaft 32 by the springs 42, but depression of any key will cause the incline 41 to deflect the projection 40 of the stop laterally, thus rotating the stop on its pivot and bringing the upper end of the stop into the path of the appropriate stop arm 36 on the shaft 32. Each stop is thus set during the initial part of the downstroke of its respective key and the stop so set will arrest the rotation of the shaft 32 when this shaft has rotated to the proper degree corresponding to the value represented by the key which is struck. Each stop is automatically reset or restored to inactive position by its spring when the respective key returns to its normal or elevated position. The shaft 32 is supported by bearings 43 and 44 mounted on the transverse supporting bars 45 and 12, ball bearings being preferably used to minimize the resistance offered to the rotation of the shaft and particularly to minimize resistance to the return of the shaft to normal position after each actuation thereof. The return rotation of the shaft 32 is effected by the spring 46, one end of which is fixed to the shaft and the other end of which is attached to a relatively fixed part, such as the cross member or support 11.

Each shaft 32 serves to actuate its respective registering or numeral dial 47 during the downstroke of a key in the respective column. As shown, a gear sector 48 is fixed on each shaft 32, such sector meshing with a dial driving pinion 49, the dial driving pinion being connected to the respective dial through the medium of a lost motion connection 50 which is similar in its construction and mode of operation to the lost motion connection shown and described in my prior Patent No. 1,323,894, granted Oct. 18, 1919, the lost motion provided by this connection between the key operated shaft 32 and the respective dial occurring during the initial part of the downstroke of the key, during which period the carry control mechanism is actuated to unlock the dials so they may advance when such advance should take place.

51 designates one of the units of the carry mechanism, the carry mechanism being of the construction shown and described in my prior Patent No. 1,309,535, granted July 8, 1919. Locking of the carry mechanism is effected, upon the initial part of the downstroke of any key, by a cam 52 which is fixed to the forward end of each shaft 32 and cooperates with a roller 53 attached to a rock shaft 54, the rock shaft 54 having an arm 55 fixed thereon, the arm 55 being connected by a link 56 to the common control member of the carry mechanism, and unlocking of the carry mechanisms is effected upon the return of the shafts 32 to their initial positions, as fully shown and described in my said Patent No. 1,309,535. Each numeral dial 47 and corresponding carry mechanism unit is mounted on a dial shaft 57 and a quotient dial 58 adapted to be used in operations of division is mounted preferably in alinement with the corresponding registering dial 47. The quotient mechanism shown corresponds substantially to that shown and described in my prior Patent No. 1,309,536, granted July 8, 1919.

Figure 12:
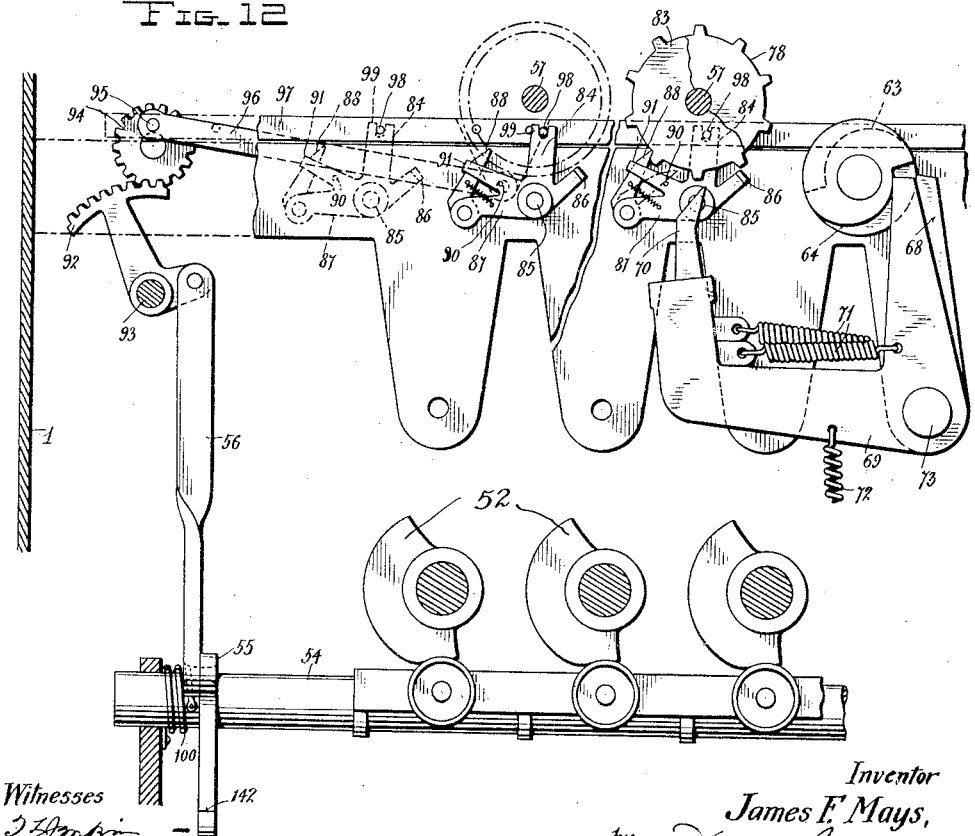
Fig. 12 is a fragmentary view showing the carry control mechanism.

The dial shaft 57 at the extreme right hand side of the machine is without a carry mechanism as the dial on this shaft does not receive a carry but all of the other dial shafts are provided with carry mechanism through which a carry can be made to each dial from the dial of next lower denomination. The carry mechanism shown generally in the present instance corresponds to that shown and described in my prior Patent No. 1,309,535 referred to and each carry unit is substantially the same as that shown and described in my prior Patent No. 1,165,337. Described briefly, each carry mechanism comprises a double pinion 59 fixed on the dial shaft 57 of lower denomination and escapement mechanism 60 mounted on the dial shaft 57 of next higher denomination. One member 61 to the pinion 59 cooperates with a gear 62 to drive a pair of similar but reversely positioned cams 63 and 64, these cams revolving once to each two revolutions of the dial shaft from which they are driven and the other member 65 of the pinion 59 operates through ten-to-one ratio reduction gearing 66 to drive a gear 67 which is mounted loosely in relation to the dial shaft of next higher denomination, so that the gear 67 will advance one step or one-tenth of a revolution upon the completion of ten steps or one complete revolution by the dial of next lower denomination. The cams 63 and 64 cooperate respectively with a pair of bell crank levers 68 and 69 causing these bell crank levers to move in reverse directions. The opposite ends of these bell crank levers carry pallets 70 which have a limited play under the control of springs 71. Springs 72 hold the bell cranks in engagement with their respective cams, the bell cranks being mounted on a common pivot pin 73. The pallets 70 cooperate with an escapement wheel 74 which constitutes a floating element of the escapement, it being the function of the pallets to permit the floating wheel 74 to advance one step each time the relative position of the pallets is reversed by the cams 63 and 64. The advance of the floating wheel is effected by a coil spring 75 which is connected at one end to a pin 76 on the floating wheel and at its opposite end to a pin 77 carried by a toothed wheel 78, the latter forming part of the follow element of the escapement. The gear 67 carries a pin 79 which projects through a slot in the floating wheel 74 and a main power spring 80 is attached at one end to this pin 79 and at its opposite end to the pin 77, the latter pin also extending through a slot in the floating wheel 74. The main power spring 80 passes around the opposite side of the shaft as compared with the spring 75, the spring 75 acting to advance the floating wheel 74 one step when released by either of the pallets 70 and the spring 80 acting to advance the escapement wheel 78 one step when the latter wheel is released, all of which is fully shown and described in my prior Patent No. 1,309,535, above referred to. The wheel 78 is provided with ten teeth and it carries a pawl 81 which coacts with registering teeth 82 on a wheel 83, the latter wheel being provided with ten teeth and being fixed to the respective dial shaft. The teeth on the wheels 78 and 83 are set opposite to each other and they are adapted to be alternately engaged by a locking escapement pawl which comprises an upturned rocker arm 84, the pawl being mounted to rock on a pivot 85 and having a rigid detent 86 disposed in a position to engage the teeth of the wheel 78, the pawl also having an extension 87 having pivoted thereon a spring-pressed detent 88 which is normally held forward against a stop pin 90, the pawl having a second stop 91 to limit the yielding movement of the detent 88 under the action of the toothed wheel 83 with which it engages. As shown in Fig. 12, the detent 88, when in its normal position, occupies the position shown by dotted lines. When the pawl is rocked to disengage the detent 86 from the wheel 78, the latter is free to advance under the influence of the power spring 80 and the wheel 78 consequently will advance one step or one-tenth of a revolution. While the wheel 78 is thus advanced, the wheel 83 which is fixed to the dial on the respective shaft, will also be advanced through the medium of the pawl and ratchet connection 81 and 82, but the extent of advance of both wheels 78 and 83 will be limited by the yielding detent 88 which then engages the wheel 83 and which yields under the advancing influence of the wheels 78 and 83 until its motion is arrested by the stop 91. The dial is thus locked against further movement until the pawl is rocked into a reverse position whereupon the rigid detent 86 will move into position to lock the wheel 78 against advance and the yielding detent 88 will remain released from the wheel 83 and it will drop into its dotted line position shown in Fig. 12. When the detent 88 is in the latter position, its point is brought into the path of the next tooth on the wheel 83 when the position of the pawl is reversed to release the detent 86 from the wheel 78. The pawl and ratchet connection between the wheels 78 and 83 permits the wheel 83 to advance with the corresponding dial when the dial is advanced in response to a key stroke, the wheel 78, however, advancing only in response to a carry operation. In the operation of the carry mechanism shown and which corresponds to that illustrated and described in my prior Patent No. 1,309,535, above mentioned, the pawls for all of the carry mechanisms are rocked in one direction to cause the detents 86 thereon to lock the wheels 78 during the initial part of a key stroke, the positions of the pawls being reversed to disengage the detents 86 from the wheels 78 and to bring the detent 88 into operation upon the wheels 83 during the final portion of the return stroke of the keys. This control of the carry mechanisms is effected by the member 56 which is actuated by any one of a series of key driven cams 52, the member 56 being connected to a toothed segment 92 which rocks on a pivot bearing 93 and cooperates with a pinion 94, the latter having a crank pin 95 thereon which cooperates with a pull bar 96, the latter being connected to a common control bar 97, this common control bar having pins 98 thereon which rest in the forked upper ends 99 of the rocker arms 84, the common control bar being thus supported by and operatively connected to the pawls which control the operation of the different carry mechanisms. It will be understood from my prior Patent No. 1,309,535 above mentioned that upon the initial part of the downstroke of any key, the corresponding cams 52 will be rotated causing depression of the arm 55, and the member 56 connected thereto will rotate the pinion 94 in a direction to draw the common control bar 97 to the left in Fig. 12. This movement of the common control bar causes the detents 86 of the different carry mechanisms to lock the toothed wheels 78 although the detents 88 are released from the wheels 83 and the final portion of the return movement of the key restores the cam 52 to a position in which the member 56 may return to its initial or upper position, thereby moving the common control bar 97 to the right in Fig. 12, thus withdrawing the detents 86 from engagement with the toothed wheels 78 and engaging the detents 88 with the toothed wheels 83, thus permitting any carry which is due to take place. The return motion of the common carry control bar 97 is effected by a spring 100 which acts on the shaft 54 which carries the arm 55.

The present invention provides relatively simple and efficient means for resetting the dials whereby the dials are returned to their zero position upon completion of one calculating operation and in preparation for another calculating operation. In the present instance the resetting mechanism is applied to the machine shown by providing the forward end of each dial shaft 57 with a disc 101 fixed thereon, each disc having a resetting pin 102 fixed thereon in a predetermined relation to the numerals of the dial on the respective shaft. The pins 102 for all of the dial shafts are all located in the same relation to the numerals on the respective dials. Each of the discs 101 also has fixed thereon a stop pin 103. The stop pins 103 for all of the dial shafts other than the first dial shaft at the right hand side of the machine are in the same relative position with respect to the numerals on the respective dials; that is to say, the stop pins 103 are located the same distance in advance of the resetting pins 102. In the case of the stop pin 103 for the first dial shaft at the extreme right of the machine, such stop pin is located one step nearer to the resetting pin 102. The purpose of this arrangement of the stop pins is to arrest rotation of the dial for the first dial shaft after this dial has completed one full revolution and to arrest rotation of the other dials to the left thereof after such dials have been rotated through nine-tenths of a revolution. Furthermore, the stop pin 103 on the disc for the first dial shaft is so located relatively to the numerals on the respective dials and the cooperating stop means that this first dial will be stopped with its "0" figure on the dial opposite to the observation opening in the casing, while the stop pins 103 for the remaining dials are so located relative to the numerals on those dials and the stopping means which operates with such pins that the remaining dials will stop with the numeral "9" thereof opposite to the respective observation openings.

The means shown and preferably used for resetting the dials comprises a set of discs 104 journaled on shafts 105 in the front of the casing and in axial alinement with the respective discs 101. Each of these discs 104 carries a pawl 106 which is yieldingly pressed outwardly against a stop 107 by a spring 108, the end of each pawl 106 when its disc 104 is revolved moving in a circular path which will bring it into engagement with the resetting pin 102 which is located on the forward side of the respective disc 101. The pawl 106 will not engage the stop pin 103 as the stop pin as shown in Figs. 4 and 5 is located on the rear side of the disc 101. Normally the discs 104 will all occupy a position with their pawls 106 disposed at the same position of rotation about the axes of the respective discs and means is provided for rotating the disc 104 for the first dial through a complete revolution to bring the "0" character on the respective dial into position and for concurrently rotating the discs 104 for the remaining dials each through nine-tenths of a revolution to bring the numerals "9" on these dials into position. As shown, this result is accomplished by providing the shafts 105 for the discs 104 with toothed pinions 108 which are fixed on these shafts, the pinions on the discs 104 for all of the dials excepting the first dial to the right being of equal diameter while the pinion 108ª for resetting the first dial at the right hand side of the machine is of proportionately small diameter so that during the stroke of a common rack bar 109 with which the pinions mesh, the pinions 108 will revolve through nine-tenths of a revolution and will bring the "9" numerals on the respective dials into position while the smaller pinion 108ª for the first or right hand dial will revolve through one complete revolution and it will bring the "0" character on such dial into position.

In order to enable the same rack to engage the pin 108ª as well as the pinion 108, the portion of the rack bar which cooperates with the pinion 108ª and also the adjacent portion of the rack bar which cooperates with the next pinion 108 to the left are reduced in width and the pinions referred to are also correspondingly reduced in width as will appear from Figs. 4 and 5. The rack bar 109 normally occupies a position to the right as shown in Figs. 3 and 4 and when the rack bar is shifted toward the left, the pinions 108 and 108ª are revolved, causing the pawls 106 on the respective discs 104 to advance, picking up the resetting pins 102 wherever these pins may happen to stand as determined by the position of rotation of the respective dials. The continued rotation of the pinions 108 advances the pins 102 until the respective dials have been brought into a common position with the "9" numerals thereon opposite to the observation openings for these dials. The pinion 108ª, however, will be revolved through a complete revolution, its pawl 106 completing a full revolution or moving one-tenth of a revolution further than the pawls operated by the pinions 108, in consequence of which the first dial or the dial at the right hand side of the machine will be revolved until its "0" character is opposite to the observation opening for this dial. In order to stop the various dials upon termination of the resetting operation and thus prevent overthrow, a stop bar 110 is provided, this stop bar being supported to move longitudinally by pins 111 which cooperate with longitudinal slots in the bar and the stop bar is provided with projections 112 to cooperate with the respective stop pins 103 which project from the rear sides of the discs 101. The stop bar 110 normally occupies a position to the right where its projections 112 will clear the stop pins 103. During the operation of the rack 109, however, to reset the dials, this stop bar 110 is shifted toward the left to bring its projections 112 into the paths of stop pins 103 to thus arrest rotation of the dials. As shown, the stop bar is shifted into operative position by a pin 113 which is attached to and projects rearwardly from the rack 109 in the path of a lug 114 which projects from the forward side of the stop bar 110, the pin 113 coming into engagement with the lug 114 when the rack bar approaches the end of its resetting movement, thus causing the stop bar 110 to travel with the rack bar during the final part of its movement, the stop bar being thereby shifted into operative relation with the stop pins 103. A spring 115 serves to return the stop bar to its non-lock position and to normally retain it in such position. In order to avoid the necessity of widening the casing of the machine to accomplish the stroke of the resetting rack 109 and also to avoid the necessity of allowing the rack bar to move outwardly so as to project from the casing of the machine during its operation, the pinion 108 for resetting the dial at the extreme left hand side of the machine is preferably operated by an auxiliary rack 116 which is mounted to reciprocate above the pinion 108 for the dial at the extreme left and to mesh with that pinion and also with one or more of the pinions 108 to the right thereof. By this arrangement, motion will be transmitted from the rack bar 109 through the pinions 108 adjacent to the pinion at the extreme left of the machine to the auxiliary rack bar 116 and the latter reciprocating in a reverse direction to the movement of the rack 109 will rotate the pinion 108 at the extreme left in the proper direction until such pinion becomes engaged with the main rack bar 109. The rack bar 109 and also the auxiliary rack bar 116 are preferably mounted to reciprocate between the front wall 117 of the casing and a plate 118 which is mounted immediately behind such front wall of the casing. The main rack bar 109 is preferably supported on anti-friction balls 119 which are placed between the lower edge of the rack bar and relatively fixed supporting rail 120 in order to minimize frictional resistance to the movements thereof.

The resetting mechanism is operated preferably by a slide 121 which is mounted between the front wall 117 of the casing and the plate 118, it being shown mounted on anti-friction balls 122 which are placed between its lower edge and a relatively fixed supporting rail 123. This slide is operated preferably by either of a pair of relatively small knobs 124 and 125, the knobs being fixed to the slide and having their stems extending through slots 126 and 127 formed in the front wall of the casing. An intermediate stationary knob 128 is also preferably provided, it being fixed to the forward side of the front wall 117 of the casing. By this arrangement the slide 121 may be shifted toward the left by either hand of the operator, it being shifted by the right hand by placing the thumb of such hand against the knob 128 and the forefinger against the knob 125 and then drawing the thumb and finger toward one another; and the slide may be actuated by the left hand of the operator by placing the thumb of such hand against the knob 124 and the finger of such hand against the left hand side of the casing and then forcing the thumb toward the left. A spring 129 serves to return the slide to its initial or right hand position and to normally retain it in such position. The reciprocatory movements of the slide 121 are transmitted to the rack bar 109 through a connection which permits the slide 121 to preliminarily advance a step before the rack bar is advanced. The connection shown comprises upward extensions 130 on the side which operate in notches 131 formed in the lower edge of the rack bar, the width of the notches being greater than the longitudinal dimensions of the extension 130 so that the slide 121 may advance to the left for a predetermined distance whereupon it picks up and moves with it the rack bar 109. This preliminary movement of the slide 121 is utilized primarily to withdraw all the detents 88 from the paths of the escapement wheels 78, thus unlocking all the dials so that they may be advanced by the resetting mechanism, this same preliminary movement serving to lock the carry mechanisms, the carry mechanisms being unlocked during the final part of the return movement of the slide. To accomplish this purpose, the slide 121 has a pin 132 fixed thereto and projecting rearwardly through a slot in the plate 118, said pin engaging the forked upper end of a lever 133. This lever 133 is pivoted to rock on a pin 134 supported by a bracket 135 within the casing and the lever 133 is formed with a cam surface 136 which cooperates with a roller 137 carried by a crank arm 138, the latter being fixed to a rock shaft 139. The rock shaft 139 which is journaled in suitable bearings has an arm 141 fixed thereto and projecting radially therefrom and the arm 55 which operates a common carry control bar through the action of the keys has a hook-like extension 142 which is located in the path of the arm 141. The spring 143 acts on the shaft 139 in a direction to elevate the arm 141 and thereby hold it clear of the extension 142 on the arm 55. The shape of the cam surface 136 on the lever 133 is such that when the slide 121 is in its normal position to the right, one arm 138 on the rock shaft 139 will occupy the full line position shown in Fig. 3, and the arm 141 on the rock shaft will be elevated clear of the extension 142. The preliminary movement of the slide 121 relatively to the rack bar 109, however, will rotate the arm 138 into the dotted line position shown in Fig. 3, and the arm 141 on the rock shaft 139 will then engage the extension 142 of the arm 55 and will thereby pull said arm downwardly. Downward movement of the arm 55 will act through the bar 56 as previously explained to shift the common carry control bar 97 into a position to unlock all the dials for advance and to lock all of the carry mechanism. Continued movement of the slide 121 causes the rack bar 109 to move with it in consequence of which the first dial at the right hand side of the machine will be rotated until its "0" character is brought into position opposite to the observation opening for its respective dial and the remaining dials will be rotated until the "9" characters thereon are in position opposite to the observation openings for the respective dials. When the latter dials are brought to the "9" position they are all ready to make a carry, the power necessary to make the carry being stored in the main power springs 75 of the respective carry mechanisms and furthermore, the movement of the first dial to the right from its "9" position to its zero position has caused the first step in the carry operation between this dial and the next dial to the left thereof to take place. Completion of the carry, however, is prevented at this time by the common carry control bar 97 which is in its locking position. The final part of the return movement of the slide 121 causes the lever 133 to return the arm 138 to its full line position shown in Fig. 3, the resulting rotation of the rock shaft 139 retracting the arm 141 thereon from the extension 142 on the arm 55 and the bar 56 then rises, restoring the common carry control bar 97 to its unlocked position. Thereupon the carry operation is completed between the first dial to the right and the next adjacent dial to the left thereof, the carry causing the latter dial to advance to its zero position and this latter dial in turn will cause a carry to be made between it and the dial of next higher denomination to the left thereof advancing the latter dial to its zero position. In like manner the carry runs completely through the dials from right to left and as a result all of the dials are brought to their zero position.

The resetting mechanism as hereinbefore described relates to the usual or main dials which are operative by the keys of the machine. Where quotient dials to be used in operations of division are included in the machine, these quotient dials may also be reset to zero concurrently with the resetting of the main dials. In Figs. 9 and 10, I have shown a portion of a quotient registering mechanism such as that shown and described fully in my prior Patent No. 1,309,536, granted July 8, 1919, filed January 11, 1919, and the necessary connections are shown by which the quotient dials are reset by the same operation which resets the main dials. As shown two of the quotient dials 142ª are represented, each of these quotient dials having a spring 143ª which acts to return the dial to its zero position and also having a stop 144 engaging a fixed stop 145 to arrest the movement of the dial when it returns to zero position under the influence of its spring. Each quotient dial is advanced by a toothed wheel 146 on which acts a reciprocating pawl 147 carried by a longitudinally reciprocating bar 148. The bar 148 is actuated by a link 149 and a crank 150, the latter being fixed on the shaft 151 on which the pinion 94, which operates the common carry control bar 97, is fixed. Each quotient dial is held in the position to which it has been advanced by a pawl 152 which is arranged to cooperate with any one of a series of projections 153 which move with the dial, there being one of these pawls 152 for each quotient dial and all of the pawls 152 are adapted to be tripped simultaneously by a common resetting bar 154 which has pins 155 thereon to engage the respective pawls. The resetting bar 154 is provided with a handle or projection 156 by means of which it may be manipulated manually as described in my Patent No. 1,309,537 previously mentioned and according to the present invention, it is provided with means whereby it is operated to reset the quotient dials concurrently with the resetting of the main registering dials. Such means as shown comprises a link 157, one end of which has a pin and slot connection 158 with the bar 154 which will permit the resetting bar to be manipulated manually if desired without interference by the automatic resetting means, the opposite end of the link 157 being pivotally connected to the upper end of a lever 159, the latter being mounted to rock on a fixed pivot 160 and the lower end of the lever 159 is arranged to be engaged by the upper end of an arm 161 which is fixed on the rock shaft 139. By this arrangement when the rock shaft 139 is rotated by the lever 133 to lock the carry control mechanism, the resetting bar 154 is drawn to the right in Fig. 9, withdrawing the pawls 152 and then releasing the quotient dials, the later then returning to their zero positions under the action of their respective springs. The return rotation of the rock shaft 139 permits the resetting bar 154 to return to its normal position, the pawls 152 being then in such position as to hold the respective quotient dials in such positions to which they may be advanced during the next operation in which the quotient dials are used.

The present invention provides dial resetting mechanism for calculating and analogous machines which is capable of operation by a minimum amount of exertion on the part of the operator, the resetting mechanism being relieved of the load that would otherwise be imposed upon it if the resetting mechanism were required to move all the dials past the carry positions to the zero positions. Therefore, because of the ease of operation, the resetting mechanism may be actuated by a relatively small knob, thus avoiding the necessity of using a crank or other relatively large handle which other resetting mechanisms have required and which have proven objectionable. Also, the resetting mechanism of the present invention remains always in operative relation with the dials, thus requiring only a simple or reciprocatory movement to effect resetting of the dials.

What is claimed is:—

1. In a calculating machine having a series of dials for numerals of different denominations, actuating means therefor, and carrying mechanisms between the dials, means for resetting the dials independently of their actuating means comprising a member operative to reset the series of dials, the dials of higher denominations being rotated by said member into positions to transmit a carrying operation therethrough upon the next step of their advance, and the dial of lower denomination being rotated by said member concurrently with but at a greater speed relatively to said dials of higher denominations to bring the dial of lower denomination to zero position.

2. In a calculating machine having a series of dials for numerals of different denominations, actuating means therefor, and carrying mechanisms between the dials, resetting mechanism embodying a member operative to concurrently revolve and reset all the dials of the series, the dials of higher denominations being thereby brought to the "9" positions and the dial of lowest denomination being thereby revolved during the same period but at a relatively greater speed to bring it into zero position.

3. In a calculating machine having dials representing numerals of different denominations, actuating means therefor, and carry mechanisms between the dials, mechanism for resetting the dials independently of their actuating means comprising a member operative to continuously rotate the dials at different relative speeds to bring one of the dials to zero position and to concurrently and during the same period bring the other dials of higher denominations into positions to transmit therethrough a carrying operation initiated by said dial which is brought to zero position.

4. In a calculating machine having a series of dials for numerals of different denominations, actuating means therefor, and carrying mechanisms between the dials, resetting mechanism for the dials embodying a series of rotatable pawls for resetting the respective dials, and a member operative to rotate said pawls concurrently, the pawls for the dials other than the dial of lowest denomination being rotated to bring their respective dials into positions to transmit a carrying operation upon their next step in their advance and the pawl for the dial of lowest denomination being rotated at a relatively greater speed and to a greater extent to bring its respective dial into zero position.

5. In a calculating machine having a series of dials for numerals of different denominations, actuating means therefor, and carrying mechanisms between the dials, resetting mechanism for the dials embodying a series of rotatable pawls arranged to pick up and advance the respective dials, and means for concurrently rotating said pawls, the pawl for the dial of lowest denomination being rotated at a greater speed and to a greater extent than the other pawls of the series to bring the dial of lowest denomination into zero position while the dials of higher denominations are brought to positions to progressively transmit a carrying operation initiated by the dial of lowest denomination.

6. In a calculating machine, a series of dials, actuating means therefor, a series of pawls mounted to rotate in circular paths and operative on the respective dials to reset them, pinions connected to said pawls for operating them, and a rack bar common to and cooperative with said pinions, the ratio of transmission between the rack bar and the pinion for the dial of lowest denomination being greater than that between the rack-bar and the other pinions.

7. In a calculating machine, a series of dials, actuating means therefor, and resetting means comprising resetting pins connected to the respective dials, a series of rotatable pawls mounted to operate upon said pins to reset the dials, pinions connected to said pawls for operating them, a main rack bar meshing with certain of said pinions, and an auxiliary rack bar meshing with the remainder of said pinions and also with some of the pinions engaged by the main rack bar, the latter pinions acting to transmit movement from the main rack bar to the auxiliary rack bar.

8. In a calculating machine, a series of dials, actuating means therefor, and means for resetting the dials comprising resetting pins movable with the respective dials, a series of pawls rotatable through arc-like paths concentric with the centers of movement of the respective resetting pins to pick up the respective pins and thus rotate the dials, the pawls remaining in operative relation with the respective resetting pins, and means for rotating the pawls.

9. In a calculating machine, a series of dials, actuating means therefor, and means for resetting the dials comprising a series of pinions for the respective dials, and a common rack bar meshing with the pinions, one of said pinions being rotated at a greater speed and to a greater extent than the other pinions.

10. In a calculating machine, a row of dials, actuating means therefor, and dial resetting means comprising a member slidable longitudinally of the row of dials and operative on the dials to reset them, and a stop bar common to the dials of the row and movable in a direction longitudinally of the row of dials, said bar being brought into operative position by movement thereof in unison with said member, after the latter has advanced to a predetermined extent, to arrest the resetting movement of the dials.

11. In a calculating machine, a row of dials, actuating means therefor, a resetting means comprising a reciprocatory member movable longitudinally of the row of dials and operative to reset them, and a stop bar reciprocatory longitudinally of the row of dials and having means operative simultaneously to arrest the resetting movements of the dials, said bar being operated by said member after the latter has advanced a predetermined distance in its movement whereby the stop bar is caused to advance in unison with said member.

12. In a calculating machine, a row of dials, actuating means therefor, and dial resetting means comprising a member reciprocatory longitudinally of the row of dials and operative to reset them, stop projections rotatable with the dials, and a stop bar movable by and in unison with said member in a direction longitudinally of the row of dials and into the paths of said stop projections after said member has advanced a predetermined distance.

13. In a calculating machine, a row of dials, actuating means therefor, and dial resetting means comprising a member common to and movable in one direction longitudinally of the row of dials to reset them, stop pins rotatable with the dials, and a stop bar operative by and in unison with said member in a direction longitudinally of the row of dials to cooperate with said stop pins after said member has advanced in said direction to a predetermined extent.

14. In a calculating machine, a row of dials, actuating means therefor, and dial resetting means comprising a reciprocatory member movable longitudinally of the row of dials and operative to move in one direction to reset the dials, a common stop bar movable in a direction longitudinally of the row of dials for arresting the resetting movements of the dials, and means by which said stop bar is caused to move longitudinally in unison with said member and into operative position after said member has advanced to a predetermined extent.

15. In a calculating machine, a series of rotatable dials, a common control bar operative to normally lock the series of dials against advance, actuating means for the dials, and dial-resetting means comprising a member operative to reset the dials, and a slide for actuating said member, said slide being movable one step preliminarily to its advancement of said member to actuate said common control bar and thus unlock the dials to permit resetting thereof.

16. In a calculating machine, a series of dials, a common control bar for normally restraining dials from movement, dial actuating means, and dial resetting means comprising a reciprocatory element operative initially to release the dials for movement, a reciprocatory member operative in unison with said element by the continued movement of said element to reset the dials, and a stop bar reciprocable in a direction transversely of the axes of the series of dials for arresting the resetting movements of the dials, said member acting to advance said stop bar in unison with it after said member has been advanced to a predetermined extent by the continued movement of said element.

17. In a calculating machine, a series of dials, actuating means therefor, and dial resetting means comprising a member operative to reset the dials, a slide for actuating said member, said slide being capable of advancing a step preliminarily to its advancement of said member, a common control bar for preventing advance of the dials of said series, and dial-unlocking means operative by said slide to actuate said common control bar during its preliminary advance.

18. In a calculating machine, a series of dials, actuating means therefor, and dial resetting means comprising a member reciprocable in a direction transversely of the axes of said dials and operative to reset the dials, a slide for actuating said member, the slide being capable of a preliminary movement relatively to said member and a subsequent movement in unison therewith, a common control bar controlling the movement of the dials, and means operative by the preliminary movement of the slide for actuating the common control bar, thus rendering the dial controlling means inactive.

19. In a calculating machine having dials, actuating means therefor, carry mechanisms between the dials, and control means common to said carry mechanisms, dial resetting means operative preliminarily to actuate the control means to lock the carry mechanisms and subsequently to reset the dials.

20. In a calculating machine having dials, actuating means therefor, carry mechanisms between the dials, and means operative to control the advance of the dials and to control the carry mechanisms, and dial-resetting means operative initially to actuate the control means to unlock the dials for advance and to lock the carry mechanisms and subsequently to reset the dials.

21. In a calculating machine, having main registering dials, actuating means therefor, and quotient registering dials, having means for advancing them incident to the advance of the corresponding main registering dials, means for operating them, resetting means for the main registering dials and resetting means for the quotient registering dials operative automatically by the resetting means for the main dials.

In testimony whereof I have hereunto set my hand in presence of two subscribing witnesses.

JAMES F. MAYS.

Witnesses:
CHAS. S. HYER,
C. A. BATEMAN.